(12) United States Patent
Okadome et al.

(10) Patent No.: US 7,987,739 B2
(45) Date of Patent: Aug. 2, 2011

(54) TRANSMISSION

(75) Inventors: Yasuki Okadome, Hiroshima (JP);
Wataru Kuwahara, Hiroshima (JP);
Masaru Shiraishi, Hiroshima (JP)

(73) Assignee: Mazda Motor Corporation (JP)

(*) Notice: Subject to any disclaimer, the term of this patent is extended or adjusted under 35 U.S.C. 154(b) by 674 days.

(21) Appl. No.: 12/129,792

(22) Filed: May 30, 2008

(65) Prior Publication Data
US 2008/0295627 A1    Dec. 4, 2008

(30) Foreign Application Priority Data

Jun. 1, 2007    (JP) ................... 2007-146609

(51) Int. Cl.
*F16H 3/08*    (2006.01)
(52) U.S. Cl. ............................................ 74/331
(58) Field of Classification Search ............... 74/329
See application file for complete search history.

(56) References Cited

U.S. PATENT DOCUMENTS 5,697,250 A * 12/1997 Ahluwalia et al. ............. 74/331
5,906,132 A    5/1999 Janiszewski
7,168,335 B2 * 1/2007 Fuhrer et al. .................. 74/329
2006/0058147 A1    3/2006 Sander et al.
2006/0266141 A1 * 11/2006 Ogami ............................ 74/325

FOREIGN PATENT DOCUMENTS

| DE | 19853824 A1 | 5/2000 |
|---|---|---|
| DE | 10360075 A1 | 7/2004 |
| DE | 10307178 A1 | 8/2004 |
| DE | 10326865 A1 | 12/2004 |
| EP | 0545102 A1 | 6/1993 |

OTHER PUBLICATIONS

Gareth Lord, "International Search Report", EP08104159, Nov. 12, 2008.

* cited by examiner

*Primary Examiner* — Edwin A Young
(74) *Attorney, Agent, or Firm* — Studebaker & Brackett PC; Donald R. Studebaker

(57) ABSTRACT

The present invention is directed to a transmission capable of minimizing the number of speed-change driven gears on a first countershaft to ensure a layout space in an engine compartment of a vehicle, and reducing a driving torque to be applied to a second countershaft to facilitate downsizing of the transmission. In the transmission, the first countershaft 2 is arranged at a position above an input shaft 1, and a first-speed driven gear 14 and a second-speed driven gear 24 are provided on the first countershaft 2.

12 Claims, 5 Drawing Sheets

FRONT SIDE
OF VEHICLE ←

TRANSMISSION

BACKGROUND OF THE INVENTION

1. Field of the Invention

The present invention relates to a transmission, and more particularly to a transmission designed to achieve six forward speed stages and one reverse speed stages, wherein an input shaft and an output shaft (countershaft) are disposed on respective different axes.

2. Description of the Related Art

Heretofore, as a transmission intended to be disposed on a lateral side of a transversely disposed engine (i.e., transverse engine), a so-called "transverse transmission" has been commonly employed which is designed such that an input shaft and an output shaft (countershaft) are disposed in parallel on respective different axes, and a plurality of speed-change gear sets are disposed between the input shaft and the output shaft (countershaft).

In view of improvement in drive feeling, there exists a strong need for the transverse transmission to further increase the number of speed stages, as with other types of transmissions.

In reality, a design aiming to increase the number of speed stages in the transverse transmission involves an increase in the number of speed-change gears, which leads to an increase in overall length of a combination of an engine and a transmission (i.e., Powertrain) and cause difficulty in adequately laying out the power train in an engine compartment of a vehicle.

Thus, it is necessary to minimize an overall transmission length while increasing the number of speed stages.

From this standpoint, the following transmission has been proposed in U.S. Pat. No. 5,906,132 (hereinafter referred to as "Patent Document 1").

This transmission comprises an input shaft, and three auxiliary shafts, such as a "first countershaft", a "second countershaft" and a "reverse shaft", wherein each of a plurality of differential driving gears (first to third output gears) for driving a differential ring gear (final ring gear) provided in a differential casing on a driving axle is provided on a corresponding one of the auxiliary shafts in such a manner as to partially share a torque transmission path to minimize an overall transmission length.

In the above type of transmission having three auxiliary shafts in addition to an input shaft, how to lay out the increased number of transmission shafts holds a key to downsizing of the transmission.

For example, in cases where a transmission is disposed on a lateral side of a reciprocating engine, the transmission is laid out on a lateral side of a lower portion of the engine in conformity to a position of a crankshaft. Thus, it is necessary to maximally downsize an upper portion of the transmission so as to ensure a space on a lateral side of an upper portion of the engine to provide enhanced flexibility in layout of engine components and vehicle body frames.

From this point of view, in the transmission disclosed in the Patent Document 1 where only two gears, i.e., a fifth-speed driven gear (i.e., a driven gear for a fifth speed stage) and a sixth-speed driven gear (i.e., a driven gear for a sixth speed stage), are provided on the first countershaft disposed at a position above the input shaft, a length of the first countershaft can be reduced to provide an increased space on the lateral side of the upper portion of the engine.

On the other hand, in the transmission disclosed in the Patent Document 1, first-speed and second-speed driven gears (i.e., driven gears for first and second speed stages) to be subjected to a relatively large driving torque are provided on the second countershaft having a relatively large length. This gives rise to a need for increasing a diameter of the second countershaft in order to resist the driving torque. Thus, there is a problem that the second countershaft cannot be downsized.

Moreover, a relatively large support span (i.e., bearing distance) of the second countershaft gives rise to another need for increasing support stiffness of a bearing for supporting the second countershaft to cause a problem about an increase in size of the bearing.

As above, the transmission disclosed in the Patent Document 1 has a problem about difficulty in achieving desirable downsizing thereof.

SUMMARY OF THE INVENTION

In view of the above circumstances, the present invention is directed to a transmission which comprises an input shaft, three auxiliary shafts, such as a first countershaft, a second countershaft and a reverse shaft, and a differential driving gear provided on each of the auxiliary shafts and adapted to drive a differential ring gear, and it is an object of the present invention to provide a technique capable of minimizing the number of speed-change driven gears on the first countershaft to ensure a layout space in an engine compartment of a vehicle, and reducing a driving torque to be applied to the second countershaft to facilitate downsizing of the transmission.

In order to achieve this object, the present invention provides a transmission for achieving six forward speed stages and one reverse speed stage, which comprises: an input shaft adapted to receive as an input a driving force from an engine; a first countershaft, a second countershaft and a reverse shaft each disposed in parallel relation to the input shaft; a first differential driving gear, a second differential driving gear and a third differential driving gear which are fixedly mounted, respectively, on the first countershaft, the second countershaft and the reverse shaft, and each of which is adapted to drive a differential ring gear on a driving axle; a plurality of speed-change driving gears each provided on the input shaft; and a plurality of speed-change driven gears each of which is provided on a corresponding one of the first countershaft and the second countershaft, and continuously meshed with a corresponding one of the speed-change driving gears. In this transmission, the first countershaft is arranged at a position above the input shaft, and the second countershaft is arranged at a position below the input shaft. Further, the speed-change driven gears include a first-speed to sixth-speed driven gears, wherein the first-speed driven gear and the second-speed driven gear are provided on the first countershaft, and the third-speed to sixth-speed driven gears are provided on the second countershaft.

In the transmission of the present invention, only two speed-change driven gears are provided on the first countershaft, so that the first countershaft can be reduced in length. In addition, the first-speed and second-speed driven gears to be subjected to a relatively large driving torque are selected as the two speed-change driven gears, so that the second countershaft becomes free from undergoing such a large driving torque.

Thus, the first countershaft can be disposed at a position above the input shaft after reducing a length thereof, and the second countershaft free from undergoing a relatively large driving torque can be reduced in diameter and supported using a smaller-size bearing.

Even though the first-speed driven gear and the second-speed driven gear are provided on the first countershaft, there is no need to increase in size of a bearing for supporting the first countershaft, because the first countershaft can be reduced in length, and therefore a support span of the first countershaft can be reduced.

As above, according to the present invention, in a transmission comprising an input shaft, three auxiliary shafts, such as the first countershaft, the second countershaft and the reverse shaft, and a plurality of differential driving gears each provided on a corresponding one of the auxiliary shafts and adapted to drive a differential ring gear, the number of speed-change driven gears on the first countershaft can be minimized to ensure a layout space in an engine compartment of a vehicle, and a driving torque to be applied to the second countershaft can be reduced to facilitate downsizing of the transmission.

These and other objects, features and advantages of the invention will become apparent upon reading the following detailed description along with the accompanying drawings.

DESCRIPTION OF THE PREFERRED EMBODIMENTS

Figure 1:
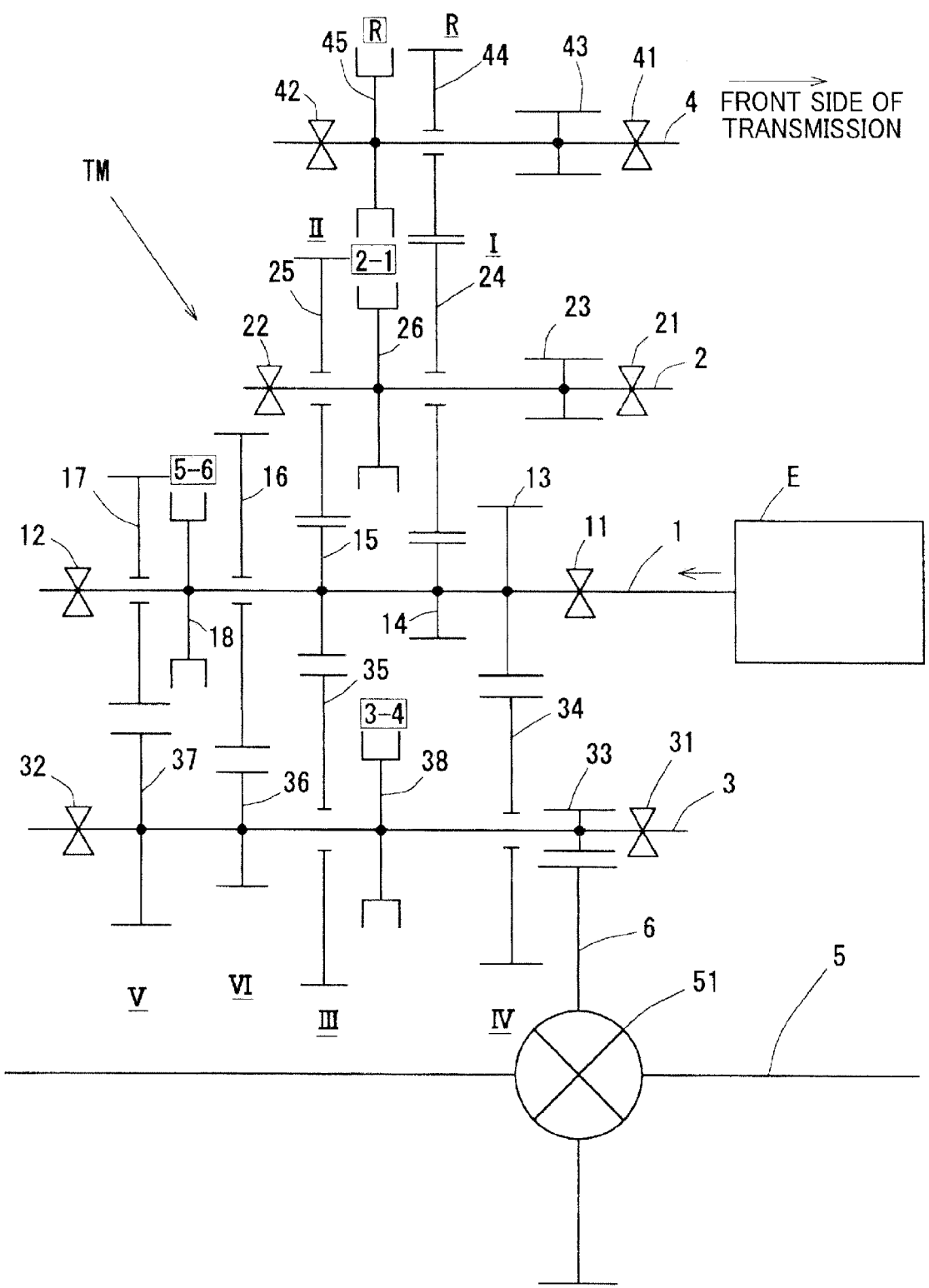
FIG. 1 is a skeletal diagram showing a geartrain of a transmission according to one embodiment of the present invention.

With reference to the drawings, the present invention will now be described based on an embodiment thereof.

A geartrain of a transmission according to one embodiment of the present invention will be firstly described with reference to FIG. 1, which is a skeletal diagram showing the geartrain of the transmission. In the following description, a near side of the transmission with respect to an engine E will be referred to as "front or front side" in terms of the transmission or any component of the transmission, and a far side of the transmission with respect to the engine E, i.e., a side of the transmission opposite to the near side, will be referred to as "rear or rear side" in terms of the transmission or any component of the transmission".

The transmission TM according to this embodiment is a so-called "transverse manual transmission" of a multi-shaft type having a plurality of shafts, which is designed to achieve six frontward speed stages and one reverse speed stage.

This transmission TM comprises an input shaft 1 adapted to receive as an input a rotational driving force from an engine E and formed and arranged to extend in a widthwise (i.e., lateral) direction of a vehicle, a first countershaft 2 disposed in parallel relation to the input shaft 1, a second countershaft 3 disposed in parallel relation to the input shaft 1 on an opposite side of the first countershaft 2 with respect to the input shaft 1, and a reverse shaft 4 disposed in parallel relation to the input shaft 1 on the same side as that of the first countershaft 2. A final rotational driving force finally output from the transmission is transmitted through a final ring gear 6 to a driving axle 5 having right and left ends each provided with a vehicle driving wheel (not shown).

The input shaft 1 is rotatably supported by two bearing members 11, 12 at respective positions of a front end thereof on a front side of the transmission TM and a rear end thereof on a rear side of the transmission TM, and provided with a plurality of speed-change gears and a synchronization mechanism at respective positions between the bearing members 11, 12.

The speed-change gears consist of a fourth-speed driving gear 13, a first-speed driving gear 14, a second-speed/third-speed driving gear 15, a sixth-speed driving gear 16 and a fifth-speed driving gear 17, i.e., total five driving gears, which are disposed in this order from the front side of the transmission TM. Among them, each of the fourth-speed driving gear 13, the first-speed driving gear 14 and the second-speed/third-speed driving gear 15 is fixedly mounted on the input shaft 1, whereas each of the sixth-speed driving gear 16 and the fifth-speed driving gear 17 is freely rotationally supported on the input shaft 1. Further, each of the sixth-speed driving gear 16 and the fifth-speed driving gear 17 is adapted to be selectively coupled to the input shaft 1 by a fifth-speed/sixth-speed synchronization mechanism 10 provided therebetween, during a speed change operation.

The first countershaft 2 is rotatably supported by two bearing members 21, 22 at respective positions of front and rear ends thereof, and provided with a plurality of speed-change gears and a synchronization mechanism at respective positions between the bearing members 11, 12, in a similar manner to that in the input shaft 1.

The speed-change gears consist of a first output gear 23, a first-speed driven gear 24 and a second-speed driven gear 25 which are disposed in this order from the front side of the transmission TM. Among them, the first output gear 23 is fixedly mounted on the first countershaft 2, whereas each of the first-speed driven gear 24 and the second-speed driven gear 25 is freely rotationally supported on the first countershaft 2. Further, each of the first-speed driven gear 24 and the second-speed driven gear 25 is adapted to be selectively coupled to the first countershaft 2 by a first-speed/second-speed synchronization mechanism 26 provided therebetween, during the speed change operation, in a similar manner to that in the input shaft 1.

The second countershaft 3 is rotatably supported by two bearing members 31, 32 at respective positions of front and rear ends thereof, and provided with a plurality of speed-change gears and a synchronization mechanism at respective positions between the bearing members 31, 32, in a similar manner to that in the input shaft 1 and the first countershaft 2.

The speed-change gears consist of a second output gear 33, a fourth-speed driven gear 34, a third-speed driven gear 35, a sixth-speed driven gear 36 and a fifth-speed driven gear 37, which are disposed in this order from the front side of the transmission TM. Among them, each of the second output gear 33, the sixth-speed driven gear 36 and the fifth-speed driven gear 37 is fixedly mounted on the second countershaft 3, whereas each of the fourth-speed driven gear 34 and the third-speed driven gear 35 is freely rotationally supported on the second countershaft 3. Further, each of the fourth-speed driven gear 34 and the third-speed driven gear 35 is adapted to be selectively coupled to the second countershaft 3 by a third-speed/fourth-speed synchronization mechanism 38 provided therebetween, during the speed change operation, in a similar manner to that in the input shaft 1 and the second countershaft 2.

The third-speed driven gear 35 is formed and arranged to be continuously meshed with the second-speed/third-speed driving gear 15 which is continuously meshed with the second-speed driven gear 25 on the first countershaft 2. Thus, the single second-speed/third-speed driving gear 15 serves as both a second-speed driving gear and a third-speed driving gear, to allow the number of speed-change driving gears on the input shaft 1 to be reduced by one.

The reverse shaft 4 is rotatably supported by two bearing members 41, 42 at respective positions of front and rear ends thereof, and provided with a plurality of speed-change gears and a synchronization mechanism at respective positions between the bearing members 41, 42, in a similar manner to that in the input shaft 1 and the first and second countershafts 2, 3.

The speed-change gears consist of a third output gear 43 and a reverse gear 43 which are disposed in this order from the front side of the transmission TM. The third output gear 43 is fixedly mounted on the reverse shaft 4, whereas the reverse gear 44 is freely rotationally supported on the reverse shaft 4, and adapted to be selectively coupled to the reverse shaft 4 by a reverse synchronization mechanism 45 provided in adjacent relation thereto, during a reverse shift operation.

The reverse gear 44 is formed and arranged to be continuously meshed with the first-speed driving gear 24 freely rotationally supported on the first countershaft 2, to achieve a reverse geartrain by utilizing the first-speed related speed-change gears (14, 24). This makes it possible to eliminate a need for providing a speed-change driving gear for the reverse gear 44, so as to allow the number of speed-change driving gears on the input shaft 1 to be further reduced by one.

A differential mechanism 51 is provided at a center of the driving axle 5, and the final ring gear 6 is fixed to an outer periphery of the differential mechanism 51.

The corresponding ones of the speed-change driving gears and the speed-change driven gears disposed on the shafts (1 to 4) are formed and arranged to be continuously meshed with each other, and each of the freely rotationally-supported speed-change gears is adapted to be coupled to a corresponding one of the shafts by a corresponding one of the synchronization mechanisms (18, 26, 38, 45), so as to output a rotational driving force of the engine E to the driving axle 5 through a corresponding one of torque transmission paths for six forward speed stages.

A torque flow of the above transmission TM will be described below.

In a neutral stage, all the synchronization mechanisms (18, 26, 38, 45) for the speed-change gears are not shifted (i.e., not slidingly moved in an axial direction of each of the shafts), and thereby freely rotationally-supported ones of the speed-change gears will continue to be freely rotated on a corresponding one of the shafts (1 to 4). Thus, even if the input shaft 1 is rotated, no rotational driving force is transmitted to the final ring gear 6 of the driving axle 5, and thereby the drive axle 5 is not rotated.

In the first speed stage, the first-speed/second-speed synchronization mechanism 26 is shifted toward the first-speed driven gear 24, and thereby the first-speed driven gear 24 is coupled to the first countershaft 2. Thus, in conjunction with rotation of the input shaft 1, a rotational driving force is transmitted by the following flow: the first-speed driving gear 14→the first-speed driven gear 24→the first countershaft 2→the first output gear 23→the final ring gear 6, and thereby the rotational driving force of the engine E is output to the driving axle 5 after the input rotational speed is most largely reduced.

In the second speed stage, the first-speed/second-speed synchronization mechanism 26 is shifted toward the second-speed driven gear 25, and thereby the second-speed driven gear 25 is coupled to the first countershaft 2. Thus, in conjunction with rotation of the input shaft 1, a rotational driving force is transmitted by the following flow: the second-speed/third-speed driving gear 15→the second-speed driven gear 25→the first countershaft 2→the first output gear 23→the final ring gear 6, and thereby the rotational driving force of the engine E is output to the driving axle 5 after the input rotational speed is moderately reduced.

In the third speed stage, the third-speed/fourth-speed synchronization mechanism 38 is shifted toward the third-speed driven gear 35, and thereby the third-speed driven gear 35 is coupled to the second countershaft 3. Thus, in conjunction with rotation of the input shaft 1, a rotational driving force is transmitted by the following flow: the second-speed/third-speed driving gear 15→the third-speed driven gear 15→the second countershaft 3→the second output gear 33→the final ring gear 6, and thereby the rotational driving force of the engine E is output to the driving axle 5 after the input rotational speed is slightly reduced.

In the fourth speed stage, the third-speed/fourth-speed synchronization mechanism 38 is shifted toward the fourth-speed driven gear 34, and thereby the fourth-speed driven gear 34 is coupled to the second countershaft 3. Thus, in conjunction with rotation of the input shaft 1, a rotational driving force is transmitted by the following flow: the fourth-speed driving gear 13→the fourth-speed driven gear 34→the second countershaft 3→the second output gear 33→the final ring gear 6, and thereby the rotational driving force of the engine E is output to the driving axle 5 at the same rotational speed as the input rotational speed.

In the fifth speed stage, the fifth-speed/sixth-speed synchronization mechanism 18 is shifted toward the fifth-speed driving gear 17, and thereby the fifth-speed driving gear 17 is coupled to the input shaft 1. Thus, in conjunction with rotation of the input shaft 1, a rotational driving force is transmitted by the following flow: the fifth-speed driving gear 17→the fifth-speed driven gear 37→the second countershaft 3→the second output gear 33→the final ring gear 6, and thereby the rotational driving force of the engine E is output to the driving axle 5 after the input rotational speed is slightly increased.

In the sixth speed stage, the fifth-speed/sixth-speed synchronization mechanism 18 is shifted toward the sixth-speed driving gear 16, and thereby the sixth-speed driving gear 16 is coupled to the input shaft 1. Thus, in conjunction with rotation of the input shaft 1, a rotational driving force is transmitted by the following flow: the sixth-speed driving gear 16→the sixth-speed driven gear 36→the second countershaft 3→the second output gear 33→the final ring gear 6, and thereby the rotational driving force of the engine E is output to the driving axle 5 after being most largely increased rotational speed.

In the reverse speed stage, the reverse synchronization mechanism 45 is shifted toward the reverse gear 44, and thereby the sixth-speed driving gear 16 is coupled to the reverse shaft 4. Thus, in conjunction with rotation of the input shaft 1, a rotational driving force is transmitted by the following flow: the first-speed driving gear 14→the first-speed driven gear 24→the reverse gear 44→the reverse shaft 4→the third output gear 43→the final ring gear 6, and thereby the rotational driving force of the engine E is output to the driving axle 5 after a direction of the input rotation is reversed.

According to the above series of torque flow, the transmission TM according to this embodiment achieves six forward speed stages and one reverse speed stage.

With reference to FIG. 1, a detailed structure of the transmission according to this embodiment will be described below. In the following description, major elements or components will be defined by the same reference numerals or codes as those in FIG. 1, and their descriptions will be omitted.

The transmission TM has a transmission casing 7 which supports the input shaft 1, and three auxiliary shafts consisting of the first countershaft 2, the second countershaft 3 and the reverse shaft 4 each disposed in parallel relation to the input shaft 1. The transmission casing 7 comprises a clutch housing 8 to be arranged on the front side of the transmission TM, and a gear casing 9.

The clutch housing 8 is prepared in such a manner as to define therein a clutch-receiving concave space 81 for receiving therein a clutch mechanism C and a differential-receiving concave space 82 for receiving therein the differential mechanism 51, and form, in a lateral wall thereof, a through-hole 83 for allowing the input shaft 1 to penetrate therethrough in the axial direction and three front-end support portions 84a, 84b, 84c for supporting respective front ends of the three auxiliary shafts (2, 3, 4) other than the input shaft 1.

The gear casing 9 is formed as a bottomed cylindrical-shaped casing member prepared in such a manner as to define an internal space 91 for receiving therein the speed-change gears, and form, in a lateral wall thereof, four rear-edge support portions 92a, 92b, 93c, 94d for supporting respective rear ends of the shafts (1, 2, 3, 4).

Figure 2:
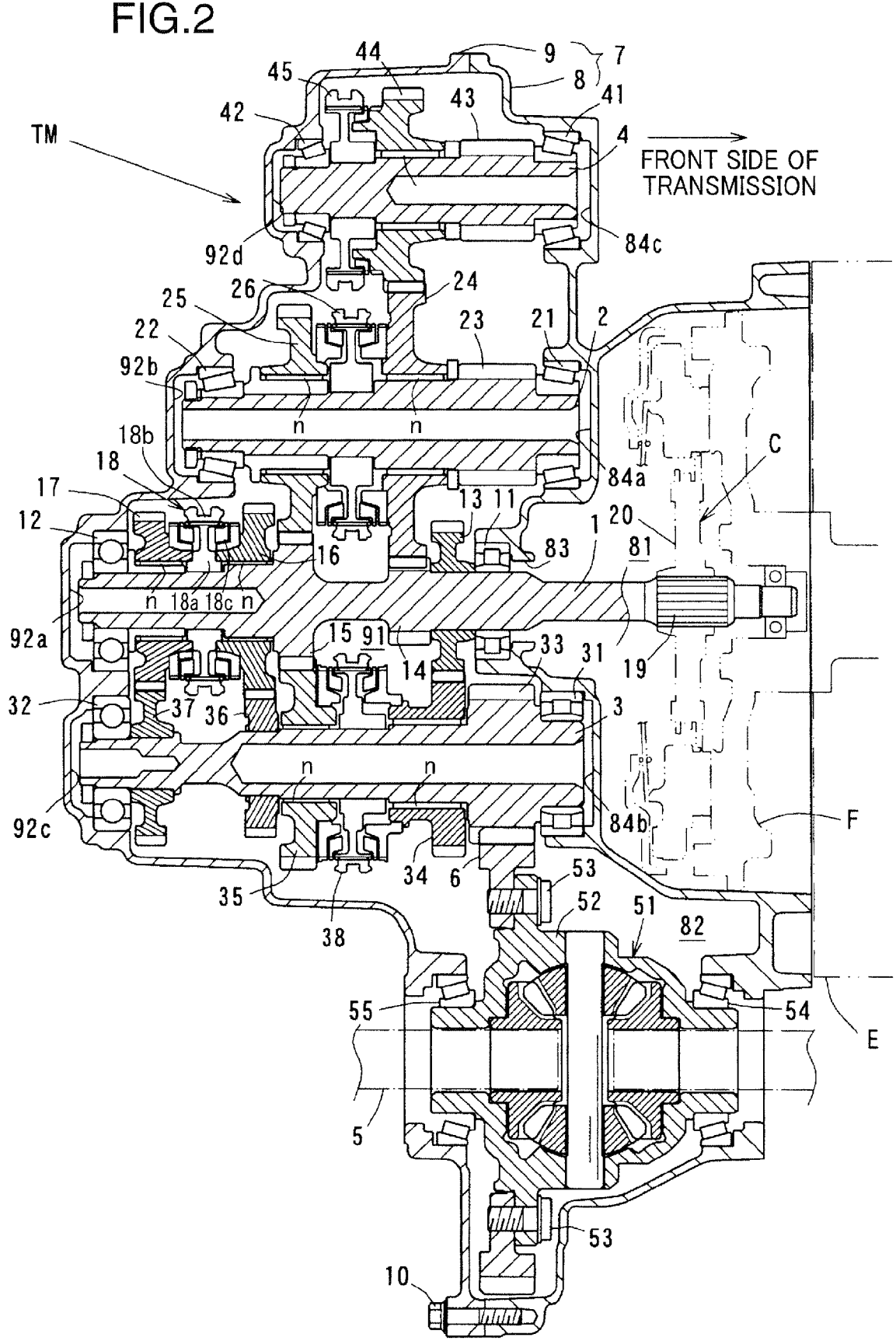
FIG. 2 is a developed sectional view of the transmission.

The clutch housing 8 and the gear casing 9 are joined to each other through matching surfaces formed around outer peripheral edges thereof, and fixedly fastened together using a plurality of fastening bolts 10 (only one of them is illustrated in FIG. 2) to form the transmission casing 7.

The front end of the input shaft 1 is formed as a spline portion 19, and a clutch plate 20 of the clutch mechanism C is fixed to the spline portion 19. Thus, the input shaft 1 can receive a rotational driving force of the engine E, from a flywheel F of the engine E through the clutch plate 20.

The fourth-speed driving gear 13 is securely fitted and firmly fixed onto the input shaft 1 at a position adjacent to the bearing member 11 located on the front side of the transmission TM, and the first-speed driving gear 14 and the second-speed/third-speed driving gear 15 are integrally formed with the input shaft 1. Further, two needle bearings n are interposed between the input shaft 1 and the freely rotationally-supported sixth-speed driving gear 16, and between the input shaft 1 and the freely rotationally-supported fifth-speed driving gear 17, respectively.

The fifth-speed/sixth-speed synchronization mechanism 18 is made up of a clutch hub 18a, a sleeve 18b and a synchronizer unit 18c, as with a conventional synchronization mechanism, and adapted to couple the sixth-speed driving gear 16 or the fifth-speed driving gear 17 to the input shaft 1 in a synchronized manner.

The first countershaft 2 is prepared in such a manner that the first output gear 23 is integrally formed therewith at a position adjacent to the bearing member 21 located on the front side of the transmission TM. Further, two needle bearings n are interposed between first countershaft 2 and the freely rotationally-supported first-speed driven gear 24, and between first countershaft 2 and the freely rotationally-supported second-speed driven gear 25, respectively.

The first-speed/second-speed synchronization mechanism 26 is made up of a clutch hub, a sleeve and a synchronizer unit (indicated by no reference code), as with a conventional synchronization mechanism, and adapted to couple the first-speed driven gear 24 or the second-speed driving gear 25 to the first counter shaft 2 in a synchronized manner.

The second countershaft 3 is prepared in such a manner that the second output gear 33 is integrally formed therewith at a position adjacent to the bearing member 31 located on the front side of the transmission TM. Further, two needle bearings n are interposed between the second countershaft 3 and the freely rotationally-supported fourth-speed driven gear 34, and between the second countershaft 3 and the freely rotationally-supported third-speed driven gear 35, respectively. The sixth-speed driven gear 36 and the fifth-speed driven gear 37 are securely fitted and fixed onto the second countershaft 3 at respective positions on the rear side of the transmission TM relative to the third-speed driven gear 35.

The third-speed/fourth-speed synchronization mechanism 38 is made up of a clutch hub, a sleeve and a synchronizer unit (indicated by no reference code), as with the above synchronization mechanisms, and adapted to couple the fourth-speed driven gear 34 or the third-speed driving gear 35 to the second counter shaft 3 in a synchronized manner.

The reverse shaft 4 is prepared in such a manner that the third output gear 43 is integrally formed therewith at a position adjacent to the bearing member 41 located on the front side of the transmission TM.

The reverse synchronization mechanism 45 is made up of a clutch hub, a sleeve and a synchronizer unit (indicated by no reference code), as with the above synchronization mechanisms, and adapted to couple the reverse gear 44 to the reverse shaft 4 in a synchronized manner.

The final ring gear 6 is fixedly fastened to an outer peripheral portion of a differential casing 52 of the differential mechanism 51 disposed on the driving axle 5, using a fastening bolt 53. The final ring gear 6 is adapted to receive all rotational driving forces from the first output gear 23, the second output gear 33 and the third output gear 43.

The differential casing 52 of the differential mechanism 51 is supported relative to the clutch housing 8 and the gear casing 9 through two bearing members 54, 55.

As seen in FIG. 2, each of the input shaft 1, the first countershaft 2, the second countershaft 3 and the reverse shaft 4 is formed to have a different length depending on the number of speed-change gears to be disposed thereon.

Particularly, the first countershaft 3 is provided with only two shafts, i.e., the first-speed driven gear 24 and the second-speed driven gear 25, and therefore formed to have a length less than that of the second countershaft 3. Further, the reverse shaft 4 is provided with only the reverse shaft 44, and therefore formed to have a length less than that of the first countershaft 2.

The reduction in length of each of the first countershaft 2 and the reverse shaft 4 makes it possible to provide enhanced on-vehicle mountability to the transmission according this embodiment during an operation of mounting it onto a vehicle, as will be described below.

Figure 3:
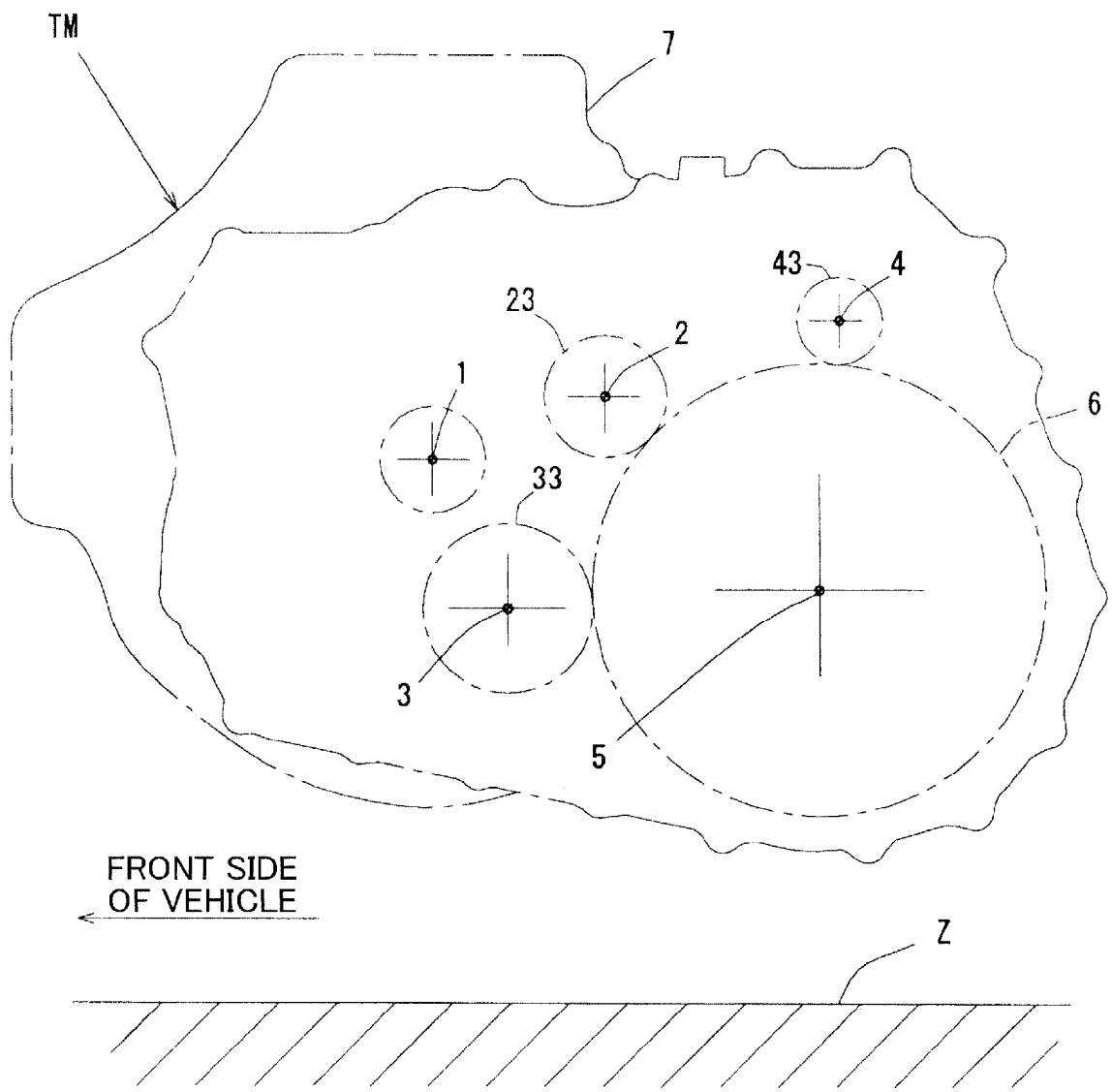
FIG. 3 is a schematic side view showing a positional relationship between respective shafts of the transmission in its mounted state on a vehicle.
Figure 4:
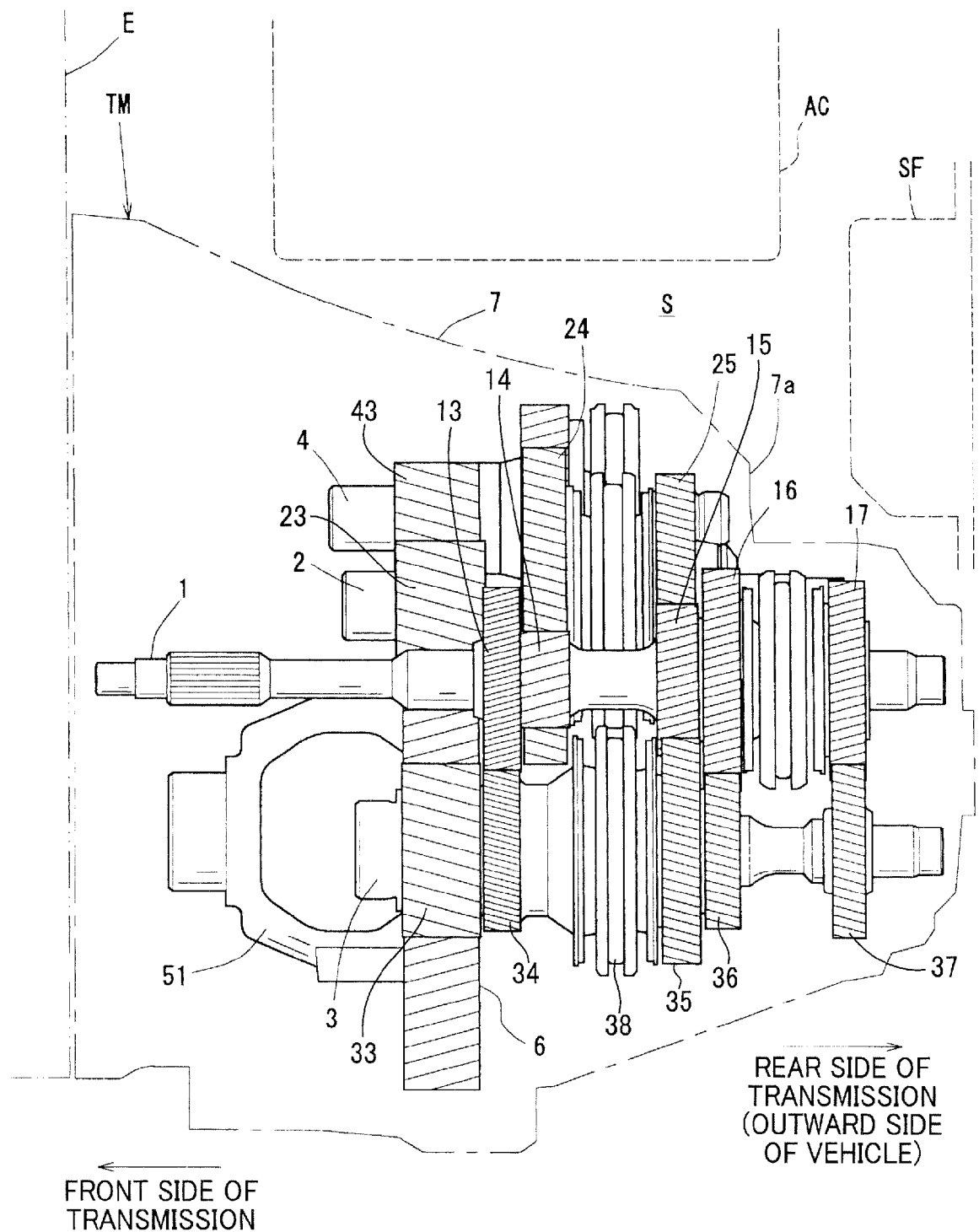
FIG. 4 is a perspective view of the transmission in the mounted state, when viewed from the side of a front end of the vehicle.
Figure 5:
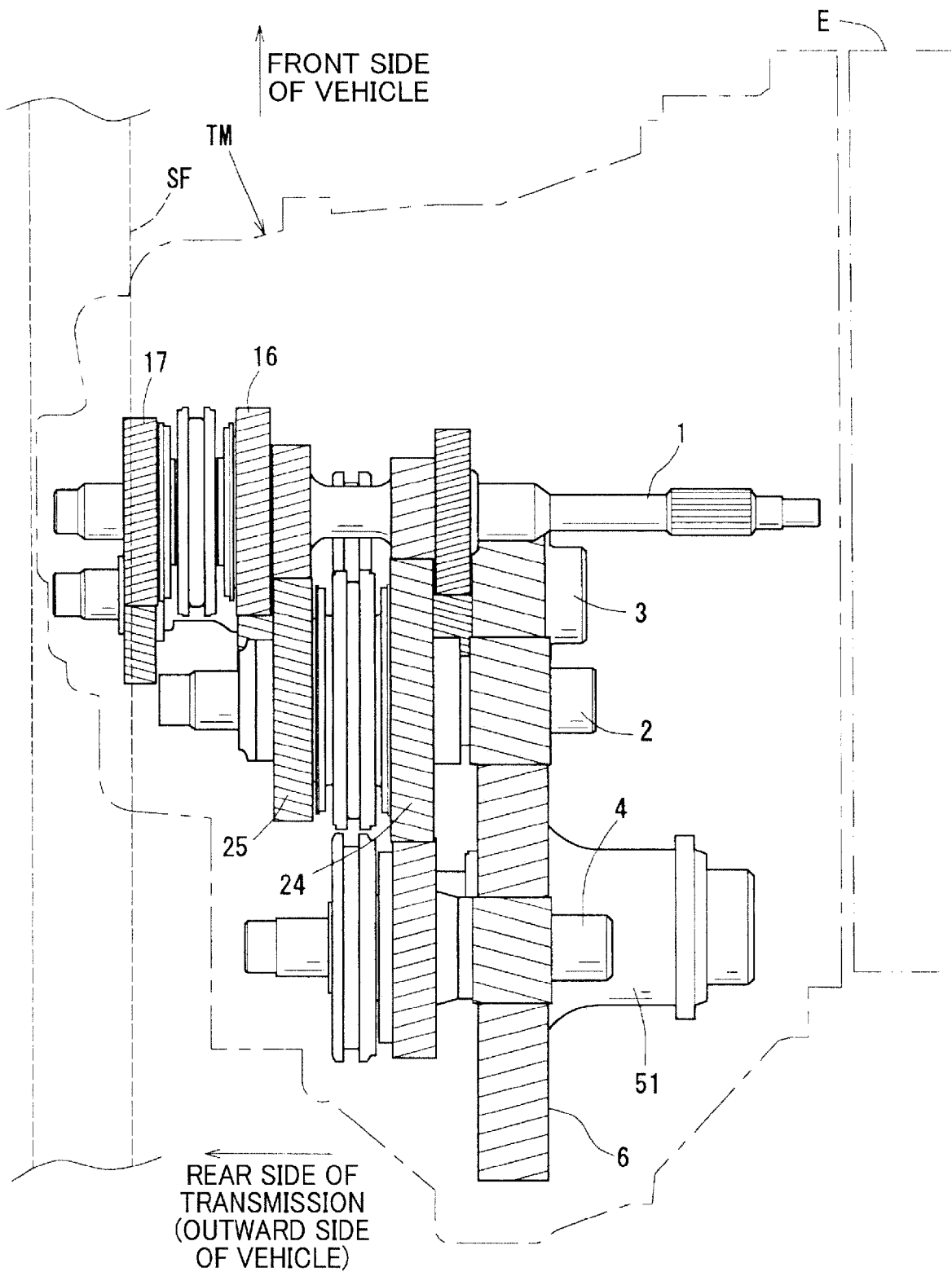
FIG. 5 is a perspective view of the transmission in the mounted state, when viewed from the side of an upper end of the vehicle.

FIG. 3 is a schematic side view showing a positional relationship between the respective shafts in its mounted state on a vehicle. FIG. 4 is a perspective view of the transmission in the mounted state, when viewed from the side of a front end of the vehicle, and FIG. 5 is a perspective view of the transmission in the mounted state, when viewed from the side of an upper end of the vehicle.

As shown in FIG. 3, in the transmission TM, the input shaft 1 is positioned on the side of a front end of the vehicle and at an approximately center of the transmission TM in a vertical (i.e., upward/downward) direction of the vehicle. The first countershaft 2 is positioned on the side of a rear end of the vehicle relative to the input shaft 1 and slightly above the input shaft 1, and the reverse shaft 4 is positioned on the side of the rear end of the vehicle relative to the first countershaft 2 and above the first countershaft 2.

The second countershaft 3 is positioned on the side of the rear end of the vehicle relative to the input shaft 1 and slightly below the input shaft 1. The driving axle 5 provided with the final ring gear 6 meshed with the respective output gears (23, 33, 43) on the shafts is positioned on the side of the rear end of the vehicle relative to the second countershaft 3. In FIG. 3, the reference code Z indicates a road surface.

The above arrangement where the first countershaft 2 and the reverse shaft 4 are positioned above the input shaft 1 makes it possible to downsize an upper portion of the transmission, as shown in FIG. 4.

Specifically, a concave portion 7a can be formed in a rear end (i.e., an outward end in a widthwise direction of the vehicle) of an upper portion of the transmission casing 7 by reducing respective lengths of the shafts (2, 4) positioned above the input shaft 1. A space created by the concave portion 7a may be utilized for arranging a front side frame SF which is a vehicle body member.

In this case, the transmission can be mounted onto the vehicle without adversely affected by the front side frame SF. For example, even if the input shaft 1 has a relatively large length, the transmission TM can be mounted onto the vehicle in such a manner as to insert a rear portion thereof into a space below the front side frame SF.

An upper space S located above the transmission TM corresponds to a space on a lateral side of an upper portion of the engine E, and therefore has a high need for allowing an engine component or the like to be arranged therein. The transmission TM according to this embodiment, is designed to maximally increase the upper space S for an air cleaner AC disposed thereabove, as shown in FIG. 4.

In this embodiment, the reverse shaft 4 having the smallest number of speed-change gears is positioned at the highest position to more increase a region of the upper space S on the rear side of the transmission TM.

As for the speed-change gears on the first countershaft 2, the second-speed driven gear 25 having a diameter less than that of the first-speed driven gear 24 is arranged on the rear side of the transmission TM. Thus, a height dimension of the rear portion of the transmission TM can be more reduced.

As for the speed-change gears on the input gear 1, the fifth-speed driving gear 17 having a diameter less than that of the sixth-speed driving gear 16 is arranged on the rear side of the transmission TM. Thus, a height dimension of the rear portion of the transmission TM can be more reduced.

As above, the transmission TM is configured to minimize a rear end thereof. Thus, the rear end of the transmission TM can be inserted into the space below the front side frame SF in such a manner that it is disposed to overlap the front side frame SF in top plan view.

In this embodiment, the first-speed and second-speed driven gears 24, 25 to be subjected to a relatively large driving torque are mounted on the first countershaft 2, as described above. That is, the third-speed to sixth-speed driven gears 34, 35, 36, 37 to be subjected to a relatively small driving torque are disposed on the second countershaft 3.

By comparison, given that the first-speed and second-speed driven gears 24, 25 are mounted on the second countershaft 3. This arrangement gives rise to a need for increasing a diameter of the second countershaft 3 in order to resist the large driving torque. Moreover, a relatively large support span of the second countershaft 3 gives rise to another need for employing a larger-size bearing member as the bearing members for the second countershaft 3. Consequently, the structure around the second countershaft 3 inevitably becomes larger to preclude downsizing of the transmission TM.

In this embodiment, the first-speed driven gear 24 and the second-speed driven gear 25 are mounted on the relatively short first countershaft 2, to allow the second countershaft 3 to be reduced in diameter, and supported using a smaller-size bearing member.

A function/advantage of the transmission TM according to the above embodiment will be described below.

In the transmission TM according to the above embodiment, the first countershaft 2 is arranged at a position above the input shaft 1, and the second countershaft 3 is arranged at a position below the input shaft 1. Further, the first-speed driven gear 24 and the second-speed driven gear 25 are provided on the first countershaft 2, and the third-speed to sixth-speed driven gears 34, 35, 36, 37 are provided on the second countershaft 3.

According to this arrangement/structure, only two driven gears (24, 25) are provided on the first countershaft 2, so that the first countershaft 2 can be reduced in length. In addition, the first-speed driven gear 24 and the second-speed driven gear 25 are selected as the two driven gears, so that the second countershaft 3 becomes free from undergoing a large driving torque.

Thus, the first countershaft 2 can be disposed at a position above the input shaft 1 after reducing a length thereof. Further, the second countershaft 3 free from undergoing a relatively large driving torque can be reduced in diameter, and each of the bearing members 31, 33 for supporting the second counter shaft 3 can be composed of a smaller-size bearing member.

That is, in a transmission TM comprising three auxiliary shafts, such as the first counter shaft 2, the second counter shaft 3 and the reverse shaft 4, and first to third output gears 23, 33, 43 each provided on respective ones of the shafts 2, 3, 4 and adapted to drive a final ring gear 6, the number of driven gears on the first countershaft 2 can be minimized to ensure a layout space in an engine compartment of a vehicle, and a driving torque to be applied to the second countershaft 3 can be reduced to facilitate downsizing of the transmission TM.

In the above embodiment, the first-speed driven gear 24 is arranged on the first countershaft 2 at a position on the front side of the transmission TM, and the second-speed driven gear 25 is arranged on the first countershaft 2 at a position on the rear side of the transmission TM.

According to this arrangement/structure, the relatively large-diameter first-speed driven gear 24 is arranged on the first countershaft 2 at a position closer (nearer) to the engine E than the relatively small-diameter second-speed driven gear 25, so that a space to be occupied by a driven gear mounted on the first countershaft 2 at a position on the rear side of the transmission TM can be reduced.

Thus, a portion of the gear casing 9 around the rear end of the first countershaft 2 on the rear side of the transmission TM can be reduced in size.

That is, a portion of the transmission TM corresponding to the rear end of the first countershaft 2 can be downsized to more increase the upper space S on the lateral side of the upper portion of the engine E.

In the above embodiment, the transmission TM includes the reverse gear 44 adapted to be driven by the first-speed driven gear 24 on the first countershaft 3, and freely rotationally supported on the reverse shaft 4 in a selectively engageable manner relative to the reverse shaft 4, and the reverse shaft 4 is arranged at a position above the input shaft 1.

According to this arrangement/structure, the reverse gear 44 is driven by the first-speed driven gear 24, so that the first-speed driving gear 14 (and driven gear 24) can additionally serve as a reverse-speed driving gear (and driven gear). In addition, only the reverse gear 44 is provided on the reverse shaft 4, so that the reverse shaft 4 can be reduced in length.

That is, a need for providing a single-purpose gear for driving the reverse gear 44 can be eliminated. In addition, even though the reverse shaft 4 is arranged at a position above the input shaft 1, the transmission TM can be downsized based on the advantage of being able to reduce a length of the reverse shaft 4.

This makes it possible to structurally simplify a mechanism for the reverse speed stage (i.e., reverse gear mechanism), and reduce a space in the engine compartment to be occupied by the transmission TM.

It is desirable to arrange the reverse shaft 4 at a position above the first countershaft 2, as in the above embodiment. The reason is that only one driven gear is provided on the reverse shaft 4 while two driven gears are provided on the first countershaft 2, and therefore the reverse shaft 4 can be reduced in length at a rate greater than that of the first countershaft 2, so as to allow the transmission TM to have a configuration with enhanced space efficiency, based on the above arrangement.

In the above embodiment, the transmission TM includes the second-speed driven gear 25 freely rotationally supported on the first countershaft 2 in a selectively engageable manner relative to the first countershaft 2, the third-speed driven gear 35 freely rotationally supported on the second countershaft 3 in a selectively engageable manner relative to the second countershaft 3, and the second-speed/third-speed driving gear 15 fixedly mounted on the input shaft 1 and adapted to drive both the second-speed driven gear 25 and the third-speed driven gear 35.

According to this arrangement/structure, the single second-speed/third-speed driving gear 15 serves as both a second-speed driving gear and a third-speed driving gear, to allow the number of driving gears on the input shaft 1 to be reduced. Thus, an overall length of the input shaft 1 can be reduced in proportion to the number of reduced driving gears.

That is, the length of the input shaft 1 having an impact on an overall length dimension of the transmission TM can be reduced. This makes it possible to facilitate a reduction in overall length of the transmission TM so as to provide enhanced on-vehicle mountability to the transmission TM.

In the above embodiment, the fifth-speed driving gear 17 is disposed on the rear end of the input shaft 1 (i.e., one end of the input shaft 1 on a far side thereof with respect to the engine E).

According to this arrangement/structure, instead of the sixth-speed driving gear 16 having a largest one of diameters of the speed-change driving gears, the fifth-speed driving gear 17 is disposed on the rear end of the input shaft 1, so that a portion of the transmission TM around the rear end of the input shaft 1 can be downsized. This makes it possible to maximally downsize the rear portion of the transmission TM so as to provide enhanced on-vehicle mountability to the transmission TM.

In the above embodiment, the fourth-speed driving gear 13, the first-speed driving gear 14, the second-speed/third-speed driving gear 15, the sixth-speed driving gear 16 and the fifth-speed driving gear 17 are disposed on the input shaft 1 in this order from the front side of the transmission TM. That is, the fourth-speed, first-speed, second-speed/third-speed, sixth-speed and fifth-speed driving gears (13, 14, 15, 16, 17) are disposed on the input shaft 1 in this order from the side of the engine E) to allow a gear arrangement to be optimized.

In addition, six forward speed stages and one reverse speed stage can be achieved using the five driving gears provided on the input shaft 1, so that the input shaft 1 can be reduced in length. This makes it possible to facilitate downsizing of the transmission TM while optimizing a gearing of the transmission TM.

In a correspondence between each element set forth in the appended claim of the present invention and each component in the above embodiment, a first differential driving gear, a second differential driving gear and a third differential driving gear correspond to the first output gear 23, the second output gear 33 and the third output gear 34, respectively. However, the present invention is not limited to the above embodiment, but encompasses various embodiments applicable to any other suitable types of transmissions.

Particularly, the present invention is not limited to a manual transmission, but may be applied, for example, to a transmission having an automatic speed change function, wherein a control rod for controlling a synchronization mechanism is operated by an electric motor, a hydraulic actuator or the like.

As mentioned above, the present invention provides a transmission for achieving six forward speed stages and one reverse speed stage, which comprises: an input shaft adapted to receive as an input a driving force from an engine; a first countershaft, a second countershaft and a reverse shaft each disposed in parallel relation to the input shaft; a first differential driving gear, a second differential driving gear and a third differential driving gear which are fixedly mounted, respectively, on the first countershaft, the second countershaft and the reverse shaft, and each of which is adapted to drive a differential ring gear on a driving axle; a plurality of speed-change driving gears each provided on the input shaft; and a plurality of speed-change driven gears each of which is provided on a corresponding one of the first countershaft and the second countershaft, and continuously meshed with a corresponding one of the speed-change driving gears. In this transmission, the first countershaft is arranged at a position above the input shaft, and the second countershaft is arranged at a position below the input shaft. Further, the speed-change driven gears include a first-speed to sixth-speed driven gears, wherein the first-speed driven gear and the second-speed driven gear are provided on the first countershaft, and the third-speed to sixth-speed driven gears are provided on the second countershaft.

In the transmission of the present invention, only two speed-change driven gears are provided on the first countershaft, so that the first countershaft can be reduced in length. In addition, the first-speed and second-speed driven gears to be subjected to a relatively large driving torque are selected as the two speed-change driven gears, so that the second countershaft becomes free from undergoing such a large driving torque.

Thus, the first countershaft can be disposed at a position above the input shaft after reducing a length thereof, and the second countershaft free from undergoing a relatively large driving torque can be reduced in diameter and supported using a smaller-size bearing.

Even though the first-speed driven gear and the second-speed driven gear are provided on the first countershaft, there is no need to increase in size of a bearing for supporting the first countershaft, because the first countershaft can be reduced in length, and therefore a support span of the first countershaft can be reduced.

As above, according to the present invention, in a transmission comprising an input shaft, three auxiliary shafts, such as the first countershaft, the second countershaft and the reverse shaft, and a plurality of differential driving gears each provided on a corresponding one of the auxiliary shafts and adapted to drive a differential ring gear, the number of speed-change driven gears on the first countershaft can be minimized to ensure a layout space in an engine compartment of a vehicle, and a driving torque to be applied to the second countershaft can be reduced to facilitate downsizing of the transmission.

Preferably, in the transmission of the present invention, the first-speed driven gear is arranged on a near side of the first countershaft with respect to the engine, and the second-speed driven gear is arranged on a far side of the first countershaft with respect to the engine.

According to this feature, the relatively large-diameter first-speed driven gear is arranged on the first countershaft at a position closer (nearer) to the engine than the relatively small-diameter second-speed driven gear, so that a space to be occupied by a driven gear mounted on the far side of the first countershaft 2 can be reduced.

Thus, a portion of the gear casing 9 around the far side of the first countershaft can be reduced in size.

That is, a portion of the transmission corresponding to the far side of the first countershaft can be downsized to more increase a space on a lateral side of an upper portion of the engine.

The above transmission may further includes a reverse gear adapted to be driven by the first-speed driven gear on the first countershaft, and freely rotationally supported on the reverse shaft in a selectively engageable manner relative to the reverse shaft, wherein the reverse shaft is arranged at a position above the input shaft.

According to this feature, the reverse gear is driven by the first-speed driven gear, so that the first-speed driving gear (and driven gear) can additionally serve as a reverse-speed driving gear (and driven gear). In addition, only the reverse gear is provided on the reverse shaft, so that the reverse shaft can be reduced in length.

That is, a need for providing a single-purpose gear for driving the reverse gear can be eliminated. In addition, even though the reverse shaft is arranged at a position above the input shaft, the transmission can be downsized based on the advantage of being able to reduce a length of the reverse shaft.

This makes it possible to structurally simplify a mechanism for the reverse speed stage (i.e., reverse gear mechanism), and reduce a space in the engine compartment to be occupied by the transmission.

Preferably, in the above transmission, the second-speed driven gear is freely rotationally supported on the first countershaft in a selectively engageable manner relative to the first countershaft, and the third-speed driven gear is freely rotationally supported on the second countershaft in a selectively engageable manner relative to the second countershaft, wherein the speed-change driving gears include a single second-speed/third-speed driving gear fixedly mounted on the input shaft and adapted to drive both the second-speed driven gear and the third-speed driven gear.

According to this feature, the single second-speed/third-speed driving gear serves as both a second-speed driving gear and a third-speed driving gear, to allow the number of driving gears on the input shaft to be reduced. Thus, an overall length of the input shaft 1 can be reduced in proportion to the number of reduced driving gears.

That is, the length of the input shaft having an impact on an overall length dimension of the transmission can be reduced. This makes it possible to facilitate a reduction in overall length of the transmission so as to provide enhanced on-vehicle mountability to the transmission.

In the above transmission, the fifth-speed driving gear may be disposed on one end of the input shaft on a far side thereof with respect to the engine.

According to this feature, instead of the sixth-speed driving gear having a largest one of diameters of the speed-change driving gears, the fifth-speed driving gear is disposed on the end of the input shaft on the far side thereof, so that a portion of the transmission TM around the end of the input shaft on the far side thereof can be downsized. This makes it possible to maximally downsize a far side of the transmission with respect to the engine so as to provide enhanced on-vehicle mountability to the transmission.

In the above transmission, the fourth-speed driving gear, the first-speed driving gear, the second-speed/third-speed driving gear, the sixth-speed driving gear and the fifth-speed driving gear are disposed on the input shaft in this order from the side of the engine. That is, the fourth-speed, first-speed, second-speed/third-speed, sixth-speed and fifth-speed driving gears are disposed on the input shaft in this order from the side of the engine to allow a gear arrangement to be optimized.

In addition, six forward speed stages and one reverse speed stage can be achieved using the total five driving gears provided on the input shaft, so that the input shaft can be reduced in length. This makes it possible to facilitate downsizing of the transmission while optimizing a gearing of the transmission.

This application is based on Japanese Patent Application Serial No. 2007-146609, filed in Japan Patent Office on Jun. 1, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A transmission for achieving six forward speed stages and one reverse speed stage, comprising:
   an input shaft adapted to receive as an input a driving force from an engine;
   a first countershaft, a second countershaft and a reverse shaft each disposed in parallel relation to said input shaft;
   a first differential driving gear, a second differential driving gear and a third differential driving gear which are fixedly mounted, respectively, on said first countershaft, said second countershaft and said reverse shaft, and each of which is adapted to drive a differential ring gear on a driving axle;
   a plurality of speed-change driving gears each provided on said input shaft; and
   a plurality of speed-change driven gears each of which is provided on a corresponding one of said first countershaft and said second countershaft, and continuously meshed with a corresponding one of said speed-change driving gears,
   wherein:
   said first countershaft is arranged at a position above said input shaft;
   said second countershaft is arranged at a position below said input shaft; and
   said speed-change driven gears include a first-speed to sixth-speed driven gears, said first-speed driven gear and said second-speed driven gear being provided on said first countershaft, said third-speed to sixth-speed driven gears being provided on said second countershaft.

2. The transmission as defined in claim 1, wherein:
said first-speed driven gear is arranged on a near side of said first countershaft with respect to said engine; and
said second-speed driven gear is arranged on a far side of said first countershaft with respect to said engine.

3. The transmission as defined in claim 2, further comprising a reverse gear adapted to be driven by said first-speed driven gear on said first countershaft, and freely rotationally supported on said reverse shaft in a selectively engageable manner relative to said reverse shaft, wherein said reverse shaft is arranged at a position above said input shaft.

4. The transmission according to claim 3, wherein:
said second-speed driven gear is freely rotationally supported on said first countershaft in a selectively engageable manner relative to said first countershaft;
said third-speed driven gear is freely rotationally supported on said second countershaft in a selectively engageable manner relative to said second countershaft; and
said speed-change driving gears include a single second-speed/third-speed driving gear fixedly mounted on said input shaft and adapted to drive both said second-speed driven gear and said third-speed driven gear.

5. The transmission according to claim 4, wherein said speed-change driving gears include a fifth-speed driving gear disposed on one end of said input shaft on a far side thereof with respect to said engine.

6. The transmission according to claim 5, wherein said speed-change driving gears include a fourth-speed driving gear, a first-speed driving gear, said second-speed/third-speed driving gear, a sixth-speed driving gear and said fifth-speed driving gear, which are disposed on said input shaft in this order from the side of said engine.

7. The transmission according to claim 1, further comprising a reverse gear adapted to be driven by said first-speed driven gear on said first countershaft, and freely rotationally supported on said reverse shaft in a selectively engageable manner relative to said reverse shaft, wherein said reverse shaft is arranged at a position above said input shaft.

8. The transmission according to claim 7, wherein:
said second-speed driven gear is freely rotationally supported on said first countershaft in a selectively engageable manner relative to said first countershaft;
said third-speed driven gear is freely rotationally supported on said second countershaft in a selectively engageable manner relative to said second countershaft; and
said speed-change driving gears include a single second-speed/third-speed driving gear fixedly mounted on said input shaft and adapted to drive both said second-speed driven gear and said third-speed driven gear.

9. The transmission according to claim 8, wherein said speed-change driving gears include a fifth-speed driving gear disposed on one end of said input shaft on a far side thereof with respect to said engine.

10. The transmission according to claim 1, wherein:
said second-speed driven gear is freely rotationally supported on said first countershaft in a selectively engageable manner relative to said first countershaft;
said third-speed driven gear is freely rotationally supported on said second countershaft in a selectively engageable manner relative to said second countershaft; and
said speed-change driving gears include a single second-speed/third-speed driving gear fixedly mounted on said input shaft and adapted to drive both said second-speed driven gear and said third-speed driven gear.

11. The transmission according to claim 10, wherein said speed-change driving gears include a fifth-speed driving gear arranged on one end of said input shaft on a far side thereof with respect to said engine.

12. The transmission according to claim 11, wherein said speed-change driving gears include a fourth-speed driving gear, a first-speed driving gear, said second-speed/third-speed driving gear, a sixth-speed driving gear and said fifth-speed driving gear, which are disposed on said input shaft in this order from the side of said engine.

* * * * *